United States Patent [19]

Muhler et al.

[11] 4,153,732
[45] May 8, 1979

[54] ANTICARIOGENIC COMESTIBLE

[75] Inventors: Joseph C. Muhler, Howe; Carl J. Kleber, Fort Wayne, both of Ind.; Ray G. Kelly, Kirkwood, Mo.

[73] Assignee: Indiana University Foundation, Bloomington, Ind.

[21] Appl. No.: 879,632

[22] Filed: Feb. 21, 1978

Related U.S. Application Data

[63] Continuation-in-part of Ser. No. 784,070, Apr. 4, 1977, abandoned, and Ser. No. 855,740, Nov. 29, 1977, which is a continuation-in-part of Ser. No. 787,752, Apr. 15, 1977, abandoned, which is a continuation of Ser. No. 654,058, Jan. 30, 1976, abandoned, said Ser. No. 784,070, is a continuation-in-part of said Ser. No. 654,058.

[51] Int. Cl.$^2$ ............... A23L 1/30; A23G 3/00; A21D 2/02; A21D 2/22
[52] U.S. Cl. .................................. 426/72; 426/74; 426/660; 426/804; 426/548; 424/48; 424/49; 424/55
[58] Field of Search ............... 426/548, 804, 660, 271, 426/572, 573, 72, 74; 424/48, 49, 55, 343, 361, 180

[56] References Cited

U.S. PATENT DOCUMENTS

| 3,278,314 | 10/1966 | Colby | 426/658 |
|---|---|---|---|
| 3,556,811 | 1/1971 | Smith | 426/660 |
| 3,619,294 | 11/1971 | Black | 426/361 |
| 3,639,169 | 2/1972 | Broeg | 426/548 |
| 3,738,843 | 6/1973 | Frey | 426/804 |
| 3,772,431 | 11/1973 | Mlkvy | 424/49 |
| 3,914,434 | 10/1975 | Bohni | 426/343 |
| 3,932,604 | 1/1976 | Barth | 424/49 |

OTHER PUBLICATIONS

Shaw et al., "Partial Substitution of Hexitols for Sugars and Dextrin in Caries-Producing Diets", J. Dent. Res. 39:377-384, 1960.
McDonald et al., "Influence of Different Carboxcyclic Acids on Enamel Dissolution in the Presence and Absence of Sucrose," J. Dent. Res. 54-187, 1975.
Bowen, "Dental Caries," Contemporary Nutrition, vol. 2, No. 8 (Aug. 1977).
Scheinin et al., "Turku Sugar Studies" Acta. Odont. Scand. 32:383-412, 1974.

*Primary Examiner*—Jeanette M. Hunter
*Attorney, Agent, or Firm*—Kirkland & Ellis

[57] ABSTRACT

Anticariogenic comestibles (i.e., food products that reduce the incidence and severity of dental caries) may be obtained by incorporating therein a cariostatic additive comprising a soluble aluminum ion containing salt and a member selected from the group consisting of adipic acid, ascorbic acid, and mixtures thereof. Dental health benefits of such products may be further enhanced by employing as a nutritive sweetening system therein a mixture of at least one first sweetening agent consisting of sorbitol and/or xylitol and at least one second sweetening agent consisting of dextrose and/or fructose, with the mixture containing at least about 75% of the first agent by weight of the mixture where dextrose is the second agent and at least about 60% of the first agent where fructose is the second agent.

17 Claims, No Drawings

ANTICARIOGENIC COMESTIBLE

CROSS-REFERENCE

This application is a continuation-in-part of applicants' co-pending applications entitled "Anticariogenic Comestible," Ser. No. 784,070, filed Apr. 4, 1977 (now abandoned) and "Noncariogenic Comestible," Ser. No. 855,740, filed Nov. 29, 1977, which was in turn a continuation-in-part of applicants' Ser. No. 787,752 application filed Apr. 15, 1977 (now abandoned), the said Ser. No. 784,070 application being a continuation-in-part and the said Ser. No. 787,752 application being a continuation of applicants' Ser. No. 654,058 application, filed Jan. 30, 1976 (now abandoned).

BACKGROUND OF THE INVENTION

1. Field of Invention

This invention relates to the production of comestibles. More specifically it is concerned with a candy product which is rendered anticariogenic through the use of a novel cariostatic additive.

2. Description of the Prior Art

The prior art has long sought a means to compensate for the cariogenic potential of comestibles, particularly foods containing high preponderances of sweeteners such as sucrose and other sugars. It has been theorized that, when sugars are placed in the mouth, they give rise to the production of acids which promote dental caries.

A contributing cause of dental caries in children is the adherence of highly refined sugars and their decomposition products to the dental plaque after ingestion, coupled with the slow rate of oral clearance, or the ability to produce high amounts of acid, or combinations of such factors.

A number of cariostatic agents have been evaluated in the past in systems wherein the agent is applied or consumed topically (i.e., directly on the teeth) in the form of a dentifrice (e.g., a toothpaste or a toothpowder). However, knowledge gained on the effectiveness of cariostatic agents used in such topical applications has not permitted prediction of efficacy for these cariostatic agents in other applications, such as in foods, and particularly in foods containing a substantial portion of sugars.

Unfortunately, known cariostatic agents have in general not provided any substantial degree of protection when used in foodstuffs. Thus, known cariostatic agents such as fluorides, phosphates, vitamin K, nitrofurans, ammonium compounds, iodoacetic acid and the like, when added separately to a food stuff containing a high percentage of sugar, have little direct topical effect in a foodstuff environment.

For the foregoing and other reasons, dental researchers have continued their efforts to develop new anticariogenic agents which not only demonstrate a high level of anticariogenic effectiveness but which are non-toxic, stable, and widely available. It has been suggested that aluminum salts may have a beneficial effect in reducing dental caries or in facilitating the uptake of fluoride by the dental enamel. See, e.g., Manly et al., "Substances Capable of Decreasing the Acid Solubility of Tooth Enamel," J. Dent Res. 28: 160 (1948); Regolati, et al., "Effects of Aluminum and Fluoride on Caries, Fluorine Content and Dissolution of Rat Molars," Hel. Odon. Acta. 13: 59 (1969); and Kelada, "Electrochemical Characteristics of Free and Complexed Fluorides in Drinking Water and The Effects of Aluminum and Iron on Fluoride Incorporation Into Tooth Enamel," Univ. Michigan Thesis (1972).

In vitro studies have shown that pretreatment of enamel with aluminum solutions resulted in increased fluoride uptake when followed by treatment with a fluoride solution; however, treatment with combinations of aluminum and fluoride did not afford any added benefit over that of fluoride alone. McCann, "the Effect of Fluoride Complex Formation on Fluoride Uptake and Retention in Human Enamel," Archs. Oral Biol. 14:521 (1969); and Gerhardt, et al., "Fluoride Uptake in Natural Tooth Surfaces Pretreated with Aluminum Nitrate," J. Dent. Res. 51:870 (1972). Moreover, the foregoing techniques have dealt primarily with the use of aluminum in combination with fluorides and have not focussed on the effect of aluminum in the absence of fluoride.

It has heretofore been suggested that the addition of a source of aluminum to the diet may reduce the cariogenic potential thereof. However, studies have to date suggested that aluminum is ineffective as a dietary anticariogenic agent. Thus, Van Reen, et al., "Trace Elements and Dental Caries: Molybdenum, Aluminum, and Titanium," Helv. Odont. Acta., 11:53–59 (1967), concluded (p. 57) that "Aluminum potassium sulfate when added to the drinking water of rats to provide 10, 50, or 100 ppm of aluminum did not afford any protection against dental caries . . . ." The same conclusion was reached with aluminum added to the dietary ration fed rats, as reported by Wynn et al., "Dental Caries in the Albino Rat on High Sucrose Diets Containing Different Amounts of Aluminum," J. Nutrition, 54:285–290 (1954), and with parenterally injected aluminum, as reported by Kruger, "The Effect of "Trace Elements" on Experimental Dental Caries in the Albino Rat," Univ. of Queensland Papers, 1:1–28 (1959).

Nor has the use of aluminum salts in dentrifices demonstrated a desirable result. Thus, while French Patent No. 3610M describes a specific combination of aluminum lactate, aluminum fluoride and calcium pyrophosphate, the abrasive interferes with the aluminum by reacting therewith to form insoluble aluminum phosphate. Similarly, U.S. Pat. No. 3,095,356 uses aluminum salts such as aluminum fluoride to coact with insoluble sodium metaphosphate abrasives to reduce the solubility of such abrasives and to increase fluoride uptake, but without independent therapeutic advantage being taken of the aluminum.

U.S. Pat. No. 3,282,792 describes low pH stannous fluoride dentifrices stabilized against precipitation and oxidation of stannous tin ions through the use of hydroxyl substituted di- and tri-carboxylic acids. However, nothing is said in the patent regarding the use of aluminum with respect to systems that do not contain fluoride. Similarly, while U.S. Pat. No. 3,937,806 teaches oral compositions comprising indium and fluoride to which malic acid is added to stabilize the indium, the patent does not recognize that beneficial results may be achieved with aluminum and carboxylic acids without incorporating fluoride.

Canadian Pat. No. 928,272 describes acidic dentifrices comprising a combination of surface active substances and albumen coagulating substances such as certain carboxylic acid salts of aluminum and other metals. However, this patent likewise fails to teach that significant dental health benefits can be achieved with aluminum containing comestibles.

Thus, while some elements are known to inhibit dental caries (e.g., F, Mo, Sr, and V) and while others are known to promote caries (e.g., Se, Mg, and Cd), the preponderance of data on aluminum indicates that it is dental caries inert as classified by Navia, "Effect of Minerals on Dental Caries", in *Dietary Chemicals* v. *Dental Caries,* A.C.S., Washington, D.C. (1970).

U.S. Pat. No. 3,772,431 concerns a mouthwash tablet containing a effervescent couple (e.g., a solid basic material and a solid organic acid such as fumaric, citric, tartaric), which produce $CO_2$ when dissolved in water, in combination with an astringent-desensitizing agent, which may (but need not) be an aluminum compound. In addition, the patent discloses the optional use of Vitamin C (ascorbic acid) as a mucin precipitating agent in combination with an anti-microbial agent and a chelating agent. The patent, however, does not suggest that any anticariogenic therapeutic effect is achieved as a result of the aluminum compounds in such compositions. In fact, other essential constituents in the tablets are incompatible with aluminum ions such that they are not therapeutically available.

In sum, the prior art has not heretofore suggested a therapeutically effective system which provides biologically available aluminum in a comestible in the absence of fluoride.

Accordingly, the primary object of this invention is to provide means for overcoming the disadvantages of the prior art approaches to reducing the dental caries potential of sugar containing foodstuffs.

A related objective is to provide an effective aluminum containing cariostatic additive for use in sweetened comestibles such as candy.

A further object is to provide anticariogenic comestibles incorporating aluminum containing cariostatic additives of the character described.

Another object is to provide anticariogenic comestibles of the character described which incorporate a noncariogenic nutritive sweetening system.

A still further object is to provide new anticariogenic candies.

SUMMARY OF THE INVENTION

The foregoing and other objects, advantages, and features of this invention may be achieved by incorporating in comestibles anticariogenically effective and nontoxic amounts of a cariostatic additive comprising at least one soluble aluminum ion containing salt and a member selected from the group consisting of adipic acid, ascorbic acid, and mixtures thereof. Where such an additive is provided in a candy product, even very low levels of additive (e.g., amounts of aluminum as low as about 100 ppm) are effective since repeated ingestion of small amounts of the anticariogenic agent has been shown to have an accumulative effect.

Desirably such additive containing comestibles also incorporate a noncariogenic nutritive sweetener comprising a mixture of at least one first sweetening agent selected from the group consisting of sorbitol, xylitol and mixtures thereof and at least one second sweetening agent selected from the group consisting of dextrose, fructose and mixtures thereof. The mixture contains at least about 75% of the first sweetening agent by weight of the mixture where dextrose is the second agent and at least about 60% of the first agent where fructose is the second agent. The sweetener is provided in the comestible in an amount effective to sweeten it.

Use of the cariostatic additive of this invention reduces the acid solubility of dental enamel and, where the sweetening system of this invention is also employed, there are obtained products which, when introduced into the mouth, exhibit: little or no harmful lowering of the dental plaque pH (indicating that the formation of decay causing oral acids has been minimized); little or no harmful decalcification of the dental enamel (decalcification being a precursor of dental caries formation); and rapid oral clearance.

DETAILED DESCRIPTION OF THE PREFERRED EMBODIMENTS

In accordance with this invention, comestibles, especially sweetened comestibles such as candy, have incorporated therein anticariogenically effective and nontoxic amounts of an additive comprising a mixture of one or more soluble aluminum ion containing salts and a member selected from the group consisting of adipic acid, ascorbic acid, and mixtures thereof.

As used herein, the term "comestible" should be understood to mean substantially any of the wide range of food products suitable for ingestion by humans, including without limitation candies, bakery products, chewing gum, prepared beverages, fruit preparations, and the like.

As used herein, the term "ascorbic acid" should be understood to encompass its isomeric epimer, isoascorbic acid, also known as erythorbic acid and D-erthrohex-2-enonic acid gamma-lactone, which may be substituted for it for purposes of this invention.

The adipic and/or ascorbic acid may be present at any convenient level greater than 0 up to about 6% by weight of the comestible. Preferably, the acid is present at a level of about 3% by weight.

The particular soluble aluminum salt employed is not critical, and substantially any nontoxic water soluble aluminum ion containing salt may be used. Suitable aluminum salts include aluminum potassium sulfate, $AlK(SO_4)_2.12H_2O$; aluminum chloride, $AlCl_3.6H_2O$; aluminum sodium sulfate, $AlNa(SO_4)_2.12H_2O$; aluminum ammonium sulfate, $AlNH_4(SO_4)_2.12H_2O$; aluminum sodium phosphate, $NaAl_3H_{14}(PO_4)_8.4H_2O$; aluminum sulfate, $Al_2(SO_4)_3.18H_2O$; aluminum nitrate, $Al(NO_3)_3$ and sodium aluminate, $NaAlO_2$. Aluminum potassium sulfate and aluminum sodium sulfate are preferred by reason of their wide availability and established safety.

The anticariogenically effective and nontoxic amount of the soluble aluminum salt should lie in the range capable of supplying about 100 ppm up to about 1000 ppm aluminum ions, (0.01–0.10 weight percent, calculated as aluminum ion). Thus, where aluminum potassium sulfate dodecahydrate and aluminum chloride hexahydrate are employed, the respective salts are present in the range of about 0.2 up to about 2% and about 0.1 up to about 1.0% by weight.

The cariostatic additive of this invention may be used in all types of sweetened comestibles such as hard candies, taffies and carmels, chocolates and chocolate coatings and in other candy products. Preferably, however, the additive is provided in tableted and cooked hard candies. Where candy products are produced from a variety of individual constituents (as in candies in which a cooked sugar based center may be coated with chocolate), the additive of this invention may be employed in one or more of the constituents or in all of them.

An important feature of this invention is the discovery that, in comparison with other conventionally used carboxylic acids such as citric acid and malic acid, ascorbic and adipic acids are relatively safe and do not decalcify the teeth when present in the mouth during the rapid oral clearance period achieved with the candies of this invention. In addition, these acids (1) do not interfere with aluminum ions as do many other carboxylic acids; (2) help temporarily to reach pH of 3.5-4.5 in the mouth at which aluminum ions are most actively incorporated into dental enamel; and (3) open the enamel apatite crystal lattice somewhat so aluminum ions may better react with the enamel.

Candy products produced in accordance with this invention are essentially the same as prior art candy products with the exception that, by virtue of the addition of the cariostatic additive of this invention, the candy products hereof may be safely consumed without causing or promoting dental caries.

Thus, anticariogenic candy products produced in accordance with this invention may contain usual and customary complementary ingredients conventionally found in candy products such as colorings, flavorings, dairy and vegetable fats, foaming agents, texturing agents such as crisped rice, nuts, and the like. However, certain conventional candy ingredients are undesirable from a dental standpoint. For example, significant amounts of fats and texturing agents such as crisped rice may adversely affect the oral clearance of the candy. Nonetheless, by employing the additive of this invention, the candies may be rendered less harmful to the teeth.

Candies produced in accordance with this invention may be prepared using the manufacturing techniques heretofore employed. The additive may be added at any convenient point so long as it is present in the final product at the desired level.

The compositions of exemplary anticariogenic candies produced in accordance with this invention are given in the following examples.

EXAMPLE I

Tableted Candy

| Constituent | Parts by Weight |
|---|---|
| Sucrose | 95.0 |
| Adipic Acid | 3.0 |
| Aluminum Potassium Sulfate | 0.2 |
| Magnesium Stearate | 1.0 |
| Flavorings, Colors, etc. | 0.8 |

EXAMPLE II

Cooked Hard Candy

| Constituent | Parts by Weight |
|---|---|
| Sucrose | 98.0 |
| Adipic Acid | 1.0 |
| Aluminum Chloride | 0.5 |
| Flavorings, Colors, etc. | 0.5 |

Desirably, the cariostatic additive of this invention is employed in sweetened comestibles containing, in place of the sucrose or other cariogenic sweetener, a noncariogenic nutritive sweeting system comprising a mixture of at least one first sweetening agent selected from the group consisting of sorbitol, xylitol and mixtures thereof and at least one second sweetening agent selected from the group consisting of dextrose, fructose and mixtures thereof, with the mixture containing at least about 75% first agent by weight of the mixture where dextrose is the second agent and at least about 60% of the first agent where fructose is the second agent.

Sorbitol is the preferred first agent, with dextrose being the preferred second agent on the basis of cost and availability. Desirably, homogeneous mixtures of the first and second agents are employed.

Where sorbitol-dextrose or xylitol-dextrose mixtures are employed, a 75% sorbitol and/or xylitol - 25% dextrose mixture is preferred. Where fructose is employed, somewhat greater amounts of the second sweetening agent may be employed. Thus, about 40% fructose is preferred in the case of sorbitol-fructose and xylitol-fructose mixtures.

Generally, the sweetening mixtures of this invention are employed at the same levels that the sugar or other cariogenic sweetening systems have been employed. Thus, where noncariogenic nutritive sweetening systems are employed in accordance with this invention in a candy product they are used preferably at a level of about 40-100% by weight of the candy product.

Candy products produced in accordance with this invention are essentially the same as prior art candy products with the exception that, by virtue of the addition of the cariostatic additive and the substitution of the noncariogenic nutritive sweetening system, they may be safely consumed with a reduction of the incidence and severity of dental caries.

Candies produced in accordance with this invention may be prepared using the foregoing noncariogenic nutritive sweetening system heretofore employed. Manufacturing techniques are generally the same although certain modifications must be made by reason of the use of sorbitol or xylitol as the principal constituent of the sweetening system.

Thus, in the case of tableted candies, the same techniques of mixing the ingredients and forming them into tablets are used, but somewhat greater humidity control must be exerted because sorbitol and xylitol are desiccants. An agent such as magnesium stearate may also be added at low levels to facilitate removal of the tablets from the mold.

With knowledge of these properties of the sorbitol and/or xylitol containing sweetening agents, one skilled in the art can readily adapt existing candy processing techniques to the preparation of other candy products pursuant to this invention.

The compositions of exemplary anticariogenic candies produced employing the nutritive sweetening system in accordance with this invention are given in the following examples.

EXAMPLE III

Tableted Candy

| Constituent | Parts by Weight |
|---|---|
| Sorbitol | 71.3 |
| Dextrose | 23.8 |
| Flavorings, Color, Etc. | 0.7 |
| Adipic Acid | 3.0 |
| Aluminum Potassium Sulfate | 0.2 |

EXAMPLE IV

Tableted Candy

| Constituent | Parts by Weight |
| --- | --- |
| Sorbitol | 81.0 |
| Dextrose | 14.0 |
| Ascorbic Acid | 3.0 |
| Flavoring, Color, etc. | 0.5 |
| Aluminum Chloride | 0.5 |
| Magnesium Stearate | 1.0 |

EXAMPLE V

Tableted Candy

| Constituent | Parts by Weight |
| --- | --- |
| Sorbitol | 57.2 |
| Fructose | 38.1 |
| Adipic Acid | 1.5 |
| Ascorbic Acid | 1.5 |
| Flavoring, Color, etc. | 0.5 |
| Magnesium Stearate | 1.0 |
| Aluminum Potassium Sulfate | 0.2 |

EXAMPLE VI

Tableted Candy

| Constituent | Parts by Weight |
| --- | --- |
| Xylitol | 72.0 |
| Dextrose | 24.0 |
| Adipic Acid | 3.0 |
| Flavoring, Colors, etc. | 0.2 |
| Magnesium Stearate | 1.0 |
| Aluminum Chloride | 0.5 |

EXAMPLE VII

Tableted Candy

| Constituent | Parts by Weight |
| --- | --- |
| Sorbitol | 64.1 |
| Dextrose | 15.5 |
| Fructose | 15.5 |
| Adipic Acid | 1.5 |
| Ascorbic Acid | 1.5 |
| Flavorings, Colors, etc. | 0.5 |
| Magnesium Streate | 1.0 |
| Aluminum Chloride | 0.5 |

EXAMPLE VIII

Tableted Candy

| Constituent | Parts by Weight |
| --- | --- |
| Sorbitol | 35.7 |
| Xylitol | 35.7 |
| Dextrose | 23.8 |
| Adipic Acid | 3.0 |
| Flavoring, Colors, etc. | 0.2 |
| Magnesium Stearate | 1.0 |
| Aluminum Chloride | 0.5 |

EXAMPLE IX

Cooked Hard Candy

| Constituent | Parts by Weight |
| --- | --- |
| Sorbitol (70% solution) | 81.8 |
| Dextrose | 17.3 |
| Adipic Acid | 0.8 |
| Flavoring, Color, etc. | 0.2 |
| Aluminum Potassium Sulfate | 0.2 |

EXAMPLE X

Taffy

| Constituent | Parts by Weight |
| --- | --- |
| Sorbitol (70% solution) | 70.1 |
| Dextrose | 16.3 |
| Egg albumin (45.27% solution) | 2.4 |
| 92 degree coconut oil | 8.9 |
| Adipic Acid | 1.7 |
| Sodium Alginate | 0.3 |
| Calcium Acetate | 0.1 |
| Emulsifier | 0.1 |
| Flavoring, Color, etc. | 0.2 |
| Aluminum Chloride | 0.5 |

EXAMPLE XI

Chocolate Candy Coating

| Constituent | Parts by Weight |
| --- | --- |
| Sorbitol | 42.0 |
| Dextrose | 14.0 |
| Kaomel (hard butter) | 30.9 |
| Cocoa Powder | 7.8 |
| Non-Fat Dry Milk | 4.2 |
| Lecithin | 0.3 |
| Salt | 0.1 |
| Vanilla Powder | 0.9 |
| Aluminum Potassium Sulfate | 0.2 |

EXPERIMENTAL EVALUATIONS

The anticariogenic attributes of the products produced in accordance with this invention have been verified by the following experimental studies.

A primary criterion in evaluating an anticariogenic agent is its ability to reduce the solubility of dental enamel, namely, enamel solubility reductions ("ESR"). In vitro "ESR" studies are carried out in the following manner. Sound bovine incisors are mounted in self-curing acrylic resin, with the labial surface exposed, and given a thorough prophylaxis with flour of pumice. A "window" is then formed on the labial surface by dripping wax over a 1.0 cm diameter aluminum foil circle. A sharp stylus is then used to circumscribe the foil window which is then pulled off exposing a round area of enamel of reproducible size.

The windowed teeth are decalcified 4 consecutive times over 20-minute intervals with 25 mls aliquots of a 0.2 N acetic acid solution (buffered to a pH of 4.0) at a stirring rate of 60 rpm using an ESR stirring apparatus. By the 4th decalcification, the amount of calcium and phosphorus being demineralized from the teeth has reached a constant level. The teeth are then treated with 25 mls of candy supernatant (1 part candy diluted with 3 parts redistilled water to simulate the dilution that occurs in the mouth upon ingestion) stirred at a rate of about 60 rpm.

After treatment, the teeth are decalcified again with 25 ml portions of the acetic acid buffer for four additional 20-minute intervals. The 5th and 8th decalcification solutions are referred to as the first post-treatment decalcification (1st PTD) and 4th post-treatment decalcification (4th PTD), respectively.

The difference in the amount of calcium and phosphorus in the 4th decalcification solution before treatment and that present in the 5th and 8th decalcification solutions after treatment, divided by the amount of the 4th decalcification, times 100 is used to determine the 1st PTD and 4th PTD ESR values. Calcium is determined using atomic absorption spectroscopy, and phosphorus using the Fiske-Subbarow method.

In order to demonstrate that repeated ingestion of candy incorporating the cariostatic additive of this invention over short periods of time has an accumulative effectiveness in reducing the solubility of dental enamel, the teeth are treated a number of times of relatively short duration (e.g., 5 minutes, the typical oral clearance time of candies of this type). Using this technique, a grape flavored tableted candy having the formulation given in Example III was evaluated. For comparative purposes a candy of the same formulation but without the aluminum salt was tested as a control. The ESR data for the Example III candy was measured after 10 five minute treatments and also after 20 five minute treatments. The ESR data, which are given in Table I, show that repeated 5-minute treatments with this dissolved candy causes an accumulated significant ESR effect. After 20 such treatments an ESR of 70% is obtained.

TABLE 1

| Treatment Solution | No. of 5-Min. Treatments | CA ESR (%) 1st PTD | CA ESR (%) 4th PTD | P ESR (%) 1st PTD | P ESR (%) 4th PTD |
|---|---|---|---|---|---|
| Example III, but no AlK(SO$_4$)$_2$.12H$_2$O (pH adjusted to 4.0) (Average of 3 readings) | 20 | 9 | 5 | 12 | 3 |
| Example III (pH adjusted to 4.0) (Average of 3 readings) | 10 | 41 | 30 | 44 | 25 |
| Example III (pH adjusted to 4.0) (Average of 3 readings) | 20 | 69 | 43 | 74 | 43 |

While ESR evaluations are indicative of the effectiveness of an anticariogenic agent, it is also very desirable to determine the amount of the agent actually taken up by the dental enamel in order to further establish its efficacy. Six windowed sound bovine incisors were treated with the candy of Example III diluted 1:3 with redistilled water. The teeth were treated 20 consecutive times over separate 5 minute intervals with 25 mls of the candy solution. After treatment the teeth were decalcified for 30 seconds in 15.0 mls of 2.0 HClO$_4$, and the amount of calcium and aluminum was determined. Calcium was determined by atomic absorption, and aluminum by the Aluminon method.

The data which are reported in Table II unequivocally demonstrate that a substantial amount of aluminum ion reacts with and is taken up into the tooth enamel. Treatment of teeth with redistilled water in a similar manner resulted in a zero aluminum uptake score. These accumulative aluminum uptake values correspond to and should be associated with the accumulative ESR values reported in Table I. Collectively they demonstrate the cariostatic effectiveness of the additives of this invention.

TABLE II

| Tooth | Calcium Ion ppm | Total g Calcium | Aluminum Ions ppm | Total g Aluminum | g Aluminum g calcium $\times 10^{-3}$ |
|---|---|---|---|---|---|
| 1 | 1.14 | 1710 | 0.79 | 11.85 | 6.93 |
| 2 | 0.89 | 1335 | 0.50 | 7.50 | 5.62 |
| 3 | 0.68 | 1020 | 0.54 | 8.10 | 7.95 |
| 4 | 1.22 | 1830 | 0.88 | 13.20 | 7.21 |
| 5 | 0.97 | 1455 | 0.88 | 13.20 | 9.07 |
| 6 | 1.00 | 1500 | 0.97 | 14.55 | 9.70 |

The anticariogenic effectiveness of the additives has also been shown in an in vivo rat study conducted as follows. Ten 35-day old Wistar strain rats were randomly distributed into two equal groups according to sex, body weight, and littermates. Group 2 rats served as the control and were fed a low fluoride corn meal diet and fluoride free water ad libitum. Group 1 rats were maintained on the same regimen except that their corn diet was supplemented with 3% adipic acid and 1% AlCl$_3$.6H$_2$O. At the end of 1 month, the rats were sacrificed, and the acid solubility of their mandibular molars was measured. The data are reported in Table III.

TABLE III

| | | Phosphorous ESR | | Calcium ESR | |
|---|---|---|---|---|---|
| Group No. | Reps. (N) | Mean + S.D. (ppm) | % Reduction | Mean + −S.D. (ppm) | % Reduction |
| 1 | 10 | 2.05±0.20 | 40.2 (p .005) | 4.40±0.40 | 35.8 (p. 005) |
| 2 | 10 | 3.43±0.20 | — | 6.85±0.68 | — |

These data show phosphorus and calcium ESR's of 40% and 35%, respectively, for rats fed a diet incorporating the cariostatic additive of this invention.

The anticariogenic effectiveness of the anticariogenic candies of this invention has also been demonstrated in rats using the method described by Francis, "The Effectiveness of Anticaries Agents in Rats Using an Incipient Carrious Lesion Method," Arch. Oral Biol., 11:141–148 (1966).

A total of 100 weanling (21 day old) Wistar strain rats were randomly divided into five equal groups according to sex, body weight, and litter mates. The parents of the weanlings were placed on a noncariogenic low fluoride corn diet and fluoride-free redistilled drinking water one week prior to mating. The dames were maintained on this same regimen during the pups' 21-day gestation period, birth, and 21-day weaning period in order to avoid exposure of the pups to any exogenous sources of fluoride during their development. After weaning, the 21-day old rats were placed on a high sucrose caries inducing diet and fluoride-free redistilled water ad libitum. Once daily, five days per week for a 4 week period, both the right and left molars of the mandibular were each swabbed for 60 seconds with the respective topical anticariogenic candy solution. A stick cotton swab was used to apply the solution to the molars by freshly dipping into the candy solution at 15 second intervals. The topical candy solutions used for treatment were prepared by dissolving the various experimental candies 1 part by weight with 3 parts redistilled water. The basic candy formula Example III was employed with the following variations:

Group 1 —Control group—Example III without the AlK(SO$_4$)$_2$.12H$_2$O
Group 2 —Example III
Group 3 —Example III with 6% AlK(SO$_4$)$_2$.12H$_2$O
Group 4 —Example III substituting dextrose for all of the sorbitol
Group 5 —Same as Group 3, substituting dextrose for all the sorbitol The rats were housed in an air-conditioned room in cages with raised screen floors, and the usual sanitary measures in the care of laboratory animals were strictly followed. The lights were time regulated to insure 12 hours of light and 12 hours of darkness.

The weight of the rats was determined initially and then at the end of the one-month study. There were no statistical differences in weight gain between the experimental groups and the control group. In addition, not one single animal died during the course of the study.

At the termination of the experiment the animals were sacrificed by chloroform inhalation, and the teeth were stained with 1% silver nitrate, sectioned in half and graded for incipient lesions. The data are reported in Table IV.

TABLE IV

| Group No. | Incipient Lesions | | | |
|---|---|---|---|---|
| | Incidence | Reduction | Severity | Reduction |
| 1 (Control) | 27.3±1.6 | — | 58.4±5.8 | — |
| 2 | 24.4±2.5 | 10.6% | 52.6±5.5 | 9.9% |
| 3 | 22.4±2.5 | 17.9% | 49.7±6.1 | 14.9% |
| 4 | 24.5±3.5 | 10.3% | 57.0±10.2 | 3.0% |
| 5 | 25.4±3.6 | 7.0% | 57.6±12.2 | 1.4% |

A statistical analysis of the data showed that the 11% caries incidence reduction noted for Group 2 (3:1 sorbitol-dextrose candy containing 0.2% AlK(SO$_4$)$_2$.12H$_2$O) was significant at the 98% confidence level, while the 18% reduction obtained with Group 3 (3:1 sorbitol-dextrose candy containing 6% AlK(SO$_4$)$_2$.12H$_2$O) was significant at the 99% level. The 10% and 7% reductions noted for Groups 4 and 5 respectively were not statistically significant. These latter two groups were identical to Groups 2 and 3 respectively except that all the sorbitol in the candies was replaced by dextrose. While Group 4 had, on the average approximately the same number of lesions as Group 2, the lesions of Group 4 were much more severe. The data demonstrate that the 3:1 sorbitol-dextrose candies containing AlK(SO$_4$)$_2$.12H$_2$O have a significant effect in reducing dental caries in vivo. They also demonstrate that all candies are to a degree benefited by the cariostatic additive system of this invention.

The criticality of the use of adipic and/or ascorbic acid in combination with the aluminum salt has also been verified experimentally. Windowed bovine teeth were treated using the described ESR method, except that the teeth were given a single 20 minute treatment with solutions containing 37 ppm aluminum ions (supplied as AlK(SO$_4$)$_2$.12H$_2$O) with 1% by weight of various carboxylic acids with pH adjusted to 4.0. Calcium and phosphorus ESR data are given the Table V and show that, in contrast to other acids which deactivate aluminum or significantly reduce its effectiveness as an enamel solubility reducing agent under these conditions, adipic and asorbic acids have a minimal effect, especially at the 4th post treatment decalcification and are compatible with aluminum.

TABLE V

| 37 ppm aluminum With 1% of | Phosphorus ESR (%) Mean (± S.D.) | | Calcium ESR (%) Mean (± S.D.) | |
|---|---|---|---|---|
| | 1st PTD | 4th PTD | 1st PTD | 4th PTD |
| No Acid | 92.1 (± 5.0) | 72.2 (±18.5) | 90.4 (± 6.0) | 75.7 (±15.5) |
| Adipic Acid | 85.7 (± 5.8) | 72.7 (± 8.9) | 81.7 (± 4.0) | 70.7 (± 8.6) |
| Asocrbic Acid | 80.7 (± 6.8) | 70.7 (±12.8) | 78.7 (± 6.7) | 72.1 (±10.3) |
| Glutaric Acid | 77.9 (± 5.2) | 65.1 (± 5.7) | 70.0 (± 5.8) | 64.1 (± 5.7) |
| Succinic Acid | 71.5 (±12.5) | 54.4 (±11.5) | 64.3 (±10.8) | 57.5 (± 7.5) |
| Fumaric Acid | 65.6 (± 2.9) | 52.2 (± 5.6) | 60.9 (± 5.8) | 52.4 (± 8.4) |
| Tartaric Acid | 7.9 (±34.7) | −25.2 (±54.0) | 3.5 (±23.8) | −15.5 (±41.4) |
| Citric Acid | 11.4 (± 6.8) | −10.9 (±10.7) | 7.5 (± 8.7) | −8.8 (±10.3) |
| Malic Acid | −12.5 (±26.6) | −11.3 (±17.7) | −16.0 (±22.4) | −6.3 (±16.0) |
| Control-Redistilled H$_2$O | −12.5 (±8.1) | −26.4 (±21.9) | −2.6 (±8.4) | −4.7 (±5.9) |

While the foregoing invention has been described with respect to candy products in particular, these techniques are intended to and have utility in relation to other food products in which the invention additive may be employed.

We claim:

1. A cariostatic additive for comestibles consisting essentially of anticariogenically effective and nontoxic amounts of at least one soluble aluminum ion containing salt and a member selected from the group consisting of adipic acid, ascorbic acid, and mixtures thereof, wherein the aluminum salt is present at a level of about 0.01 up to about 0.10% calculated as aluminum ion and the acid member is present at a level of greater than 0 up to about 6% by weight of the comestible.

2. An additive, as claimed in claim 1, wherein the member is adipic acid.

3. An additive as claimed in claim 1, wherein the aluminum salt is aluminum potassium sulfate dodecahydrate, AlK(SO$_4$)$_2$.12H$_2$O.

4. An additive, as claimed in claim 1, wherein the aluminum salt is aluminum chloride hexahydrate, AlCl$_3$.6H$_2$O.

5. An anticariogenic comestible comprising anticariogenically effective and nontoxic amounts of at least one soluble aluminum ion containing salt and a member selected from the group consisting of adipic acid, ascorbic acid and mixtures thereof.

6. A comestible, as claimed in claim 5, wherein the aluminum salt is present at a level of about 0.01 up to about 0.10% calculated as aluminum ion and the member is present at a level of greater than 0 up to about 6%, by weight of the comestible.

7. A comestible, as claimed in claim 5, wherein the member is adipic acid.

8. A comestible, as claimed in claim 5, wherein the aluminum salt is aluminum potassium sulfate dodecahydrate, $AlK(SO_4)_2 \cdot 12H_2O$.

9. A comestible, as claimed in claim 5, wherein the aluminum salt is aluminum chloride hexahydrate, $AlCl_3 \cdot 6H_2O$.

10. A comestible, as claimed in claim 5, and further comprising as a nutritive sweetening agent a mixture of at least one first sweetening agent selected from the group consisting of sorbitol, xylitol, and mixtures thereof and at least one second sweetening agent selected from the group consisting of dextrose, fructose, and mixtures thereof, with the mixture containing at least about 75% of the first agent by weight of the mixture where dextrose is the second agent and at least about 60% of the first agent by weight where fructose is the second agent, the mixture being present in an amount effective to sweeten the comestible.

11. A comestible, as claimed in claim 10, wherein the first agent is sorbitol and the second agent is dextrose.

12. A comestible, as claimed in claim 10, wherein the first agent is sorbitol and the second agent is fructose.

13. A comestible, as claimed in claim 10, wherein the first agent is xylitol and the second agent is dextrose.

14. A comestible, as claimed in claim 10, wherein the first agent is xylitol and the second agent is fructose.

15. An anticariogenic candy product comprising:
   about 0.1 up to about 1.0% by weight of the product of a soluble aluminum ion containing salt;
   greater than 0 up to about 6.0% by weight of a member selected from the group consisting of adipic acid, ascorbic acid, and mixtures thereof; and
   at least about 40% by weight of a nutritive sweetening mixture of sorbitol and dextrose comprising at least 75% sorbitol by weight of the mixture.

16. A process for rendering a sweetened comestible anticariogenic comprising the step of incorporating therein anticariogenically effective and nontoxic amounts of at least one soluble aluminum ion containing salt and a member selected from the group consisting of adipic acid, ascorbic acid, and mixtures thereof.

17. A process, as claimed in claim 17, and further comprising the step of incorporating therein as a nutritive sweetening agent a mixture of at least one first sweetening agent selected from the group consisting of sorbitol, xylitol and mixtures thereof and at least one second sweetening agent selected from the group consisting of dextrose, fructose, and mixtures thereof, with the mixture containing at least about 75% of the first agent by weight of the mixture where dextrose is the second agent and at least about 60% of the first agent by weight of the mixture where fructose is the second agent, the mixture being incorporated in an amount effective to sweeten the comestible.

* * * * *

UNITED STATES PATENT AND TRADEMARK OFFICE
CERTIFICATE OF CORRECTION

PATENT NO. : 4,153,732
DATED : May 8, 1979
INVENTOR(S) : Joseph C. Muhler, et al.

It is certified that error appears in the above–identified patent and that said Letters Patent are hereby corrected as shown below:

Claim 17, column 14, line 20, "17" should read -- 16 --.

Signed and Sealed this

Seventeenth Day of July 1979

[SEAL]

Attest:

Attesting Officer

LUTRELLE F. PARKER
Acting Commissioner of Patents and Trademarks